(12) United States Patent
Nguyen

(10) Patent No.: US 7,832,637 B2
(45) Date of Patent: Nov. 16, 2010

(54) MANAGING RETAIL TRANSACTIONS

(76) Inventor: Martin Khang Nguyen, 13691 Palomar St., Westminster, CA (US) 92683

( * ) Notice: Subject to any disclaimer, the term of this patent is extended or adjusted under 35 U.S.C. 154(b) by 678 days.

(21) Appl. No.: 11/825,411

(22) Filed: Jul. 5, 2007

(65) Prior Publication Data
US 2008/0251582 A1 Oct. 16, 2008

Related U.S. Application Data

(60) Provisional application No. 60/818,872, filed on Jul. 5, 2006.

(51) Int. Cl.
*G06K 15/00* (2006.01)
(52) U.S. Cl. .................. 235/383; 705/16
(58) Field of Classification Search .............. 235/383; 705/14, 35, 16
See application file for complete search history.

(56) References Cited

U.S. PATENT DOCUMENTS

| | | | |
|---|---|---|---|
| 7,267,277 B2 * | 9/2007 | Apte et al. | 235/454 |
| 7,392,945 B1 * | 7/2008 | Philyaw | 235/383 |
| 2002/0198803 A1 * | 12/2002 | Rowe | 705/35 |
| 2005/0149398 A1 * | 7/2005 | McKay | 705/14 |

* cited by examiner

*Primary Examiner*—Daniel A Hess
(74) *Attorney, Agent, or Firm*—Blakely Sokoloff Taylor & Zafman

(57) ABSTRACT

An embodiment of the present invention includes a technique for retail transactions. A display unit shows product information on a product. A transaction controller provides the product information. A database stores at least one of the product information and customer information.

Another embodiment of the invention includes a technique to interact with a customer in a retail setting. A reader reads product information related to a product. A communication controller transmits the product information to a point-of-sale (POS) terminal.

Another embodiment of the invention includes a technique to simplify record tracking of customers. Transaction data in transactions made by a plurality of consumers are recorded. The recorded transaction data is maintained as part of transaction records of the consumers. The transaction records are compiled according to pre-defined criteria.

15 Claims, 7 Drawing Sheets

MANAGING RETAIL TRANSACTIONS

RELATED APPLICATION

This application claims the benefit of the provisional application, titled "Product Shelf Display", filed Jul. 5, 2006, Ser. No. 60/818,872.

BACKGROUND

1. Field of the Invention

Embodiments of the invention relate to the field of retail sales management, and more specifically to management of retail transactions.

2. Description of the Related Art

Currently, when a store needs to make a change to a product, price, or description, new labels need to be written or printed over the old labels, or a brand new printed description note is made to the old one. Doing this would be time consuming, untimely, and labor intensive, and may lead to misplaced, detached, or wrongly attached paper product descriptions to the product displayed on shelves, and waste of materials.

In addition, a customer shopping in a retail store may desire the convenience and accuracy of obtaining discount or product information, redeeming coupons, etc. without the hassle of waiting in lines or waiting for the cashier to scan several coupons.

Moreover, information regarding customers' transactions may be valuable for marketing and promotional activities.

BRIEF DESCRIPTION OF THE DRAWINGS

Embodiments of invention may best be understood by referring to the following description and accompanying drawings that are used to illustrate embodiments of the invention. In the drawings.

DESCRIPTION

Embodiments of the invention include a technique for managing retail transactions. A display unit shows product information on a product. A transaction controller provides the product information. A database stores at least one of the product information and customer information. Another embodiment of the invention includes a technique to interact with a customer in a retail setting. A reader reads product information related to a product. A communication controller transmits the product information to a point-of-sale (POS) terminal. Another embodiment of the invention includes a technique to simplify record tracking of customers. Transaction data in transactions made by a plurality of consumers are recorded. The recorded transaction data is maintained as part of transaction records of the consumers. The transaction records are compiled according to pre-defined criteria.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 1:
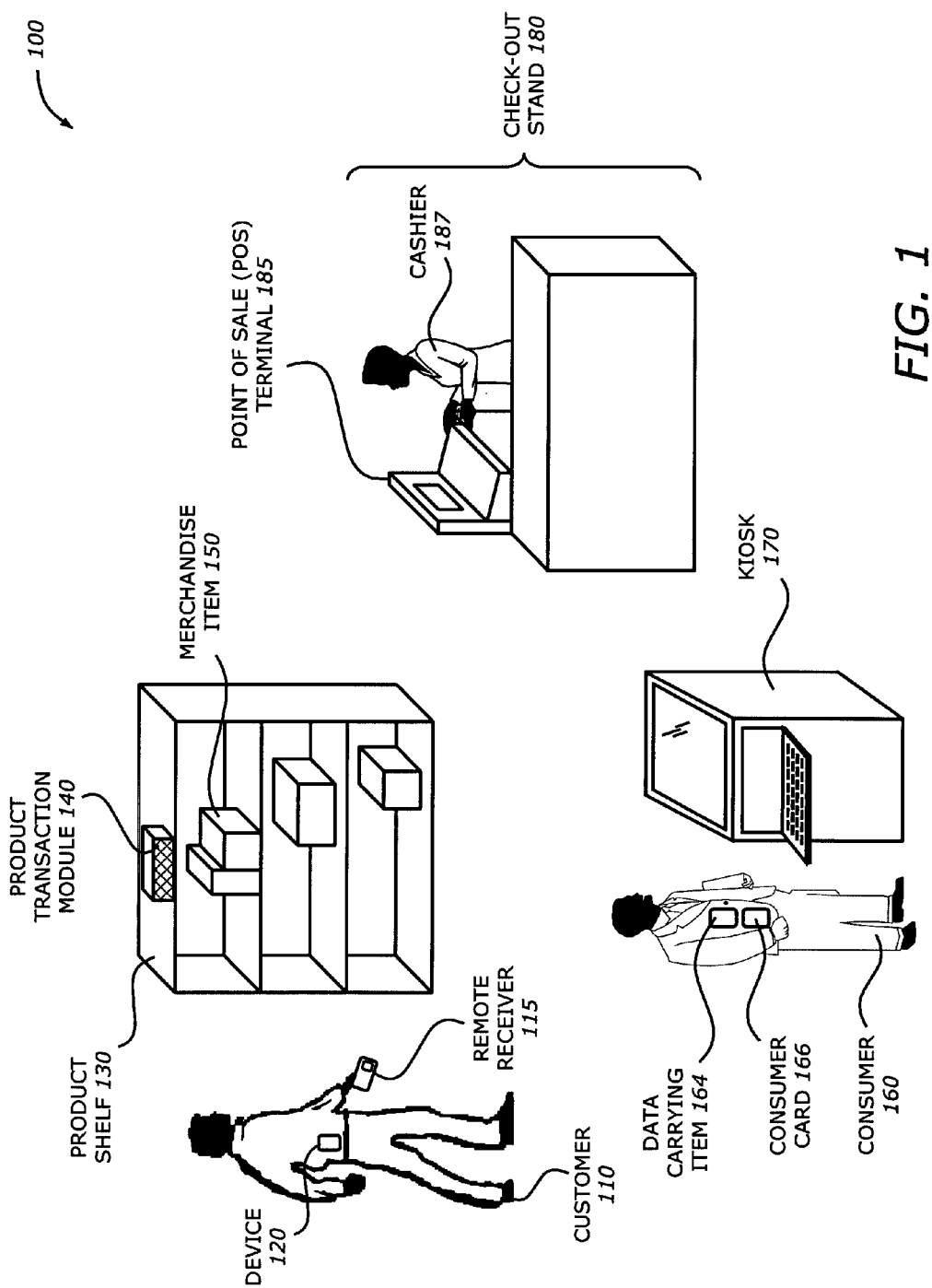
FIG. 1 is a diagram illustrating a system according to one embodiment of the invention.

FIG. 1 is a diagram illustrating a system 100 according to one embodiment of the invention. The system 100 represents a typical selling entity such as a retailer or a wholesaler. The selling entity may be a member of a business system that provides discount coupon services to consumers. The selling entity may be a retail store, a supermarket, a grocery store, a shopping mall boutique, a department store, etc. The system 100 includes customers 110 and 160, product shelves $130_1$ to $130_N$, product transaction modules $140_1$ to $140_N$, merchandise items $150_1$ to $150_K$, a kiosk 170, and a check-out stand 180. Note that the system 100 may include more or less than the above components. For example, the kiosk 170 may be optional.

The customer 110 is a typical shopper who shops in the store. The consumer 110 may have a remote receiver 115 and/or a device 120. The remote receiver 115 is a device that communicates with the various modules in the selling entity. It may receive or download the product information in a downloadable format. The remote receiver 115 may be a personal digital assistant (PDA), a cellular device (e.g., cell phone), a wireless reader, a bar code reader, a RFID reader, a magnetic reader, a smart card reader, a storage medium reader, a handheld device, a handheld computer, and a notebook or laptop computer. The device 120 may be any device that contains information regarding the customer 110 such as usage history, name, identification information, membership information, expiration date, etc. It may be a card or a storage medium (e.g., smart card). The information may be encoded or embedded in the device in a form that can be read by a reader such as barcode, magnetic strip, etc.

The product shelves $130_1$ to $130_N$ include shelves or storage to store and display products or merchandise items $150_1$ to $150_L$. Typically the shelves $130_1$ to $130_N$ are arranged to display products or merchandise items $150_1$ to $150_L$ in aisles according to their categories. For example, an aisle labeled Oral Hygiene may display merchandises such as toothbrush, toothpaste, floss, mouthwash products, etc.

The product transaction modules (PTM) $140_1$ to $140_K$ are modules that display the product information of the corresponding products or merchandise items $150_1$ to $150_L$. They are typically located near or in proximity to the merchandise items $150_1$ to $150_L$. Each of the product transaction modules $140_1$ to $140_K$ may be firmly attached to the shelf that holds the corresponding merchandise item. It displays the product information in a prominent and/or attention attracting manner. Typically the display may be seen from a distance so that shoppers may be able to see and recognize the product information. Each of the product transaction modules $140_1$ to $140_K$ may be programmed, configured, or set up, remotely or locally, by the store personnel such as the store manager so that the product information may be updated in real-time or near real-time, to reflect the sales information such as description, manufacturer, price, expiration date, promotional details, sales information, discount, etc.

The user 160 is a person who may be interested in using the kiosk 170. The user 160 may have registered to the business system and have user information stored in the user database of the business system. The user information may include user identification, a user profile, and other relevant information such as purchase habit, account information, credit balance, discount privilege level, etc. The user 160 carries a data-carrying item 164 and/or a consumer card 166.

The data-carrying item 164 may be any item that carries or contains data such as product information. The product information embedded in the data-carrying item 164 may be the product name, manufacturer, discount value, sales period, expiration date, limit rule (e.g., one per product). The data-carrying item 164 may be a paper coupon, a product identifier, or a promotional item. The product information embedded in the data-carrying item 164 may be encoded in a form that may be read by a reader such as barcode, magnetic strip, electronic, etc.

The consumer card 166 may be a loyalty card, a saving card, a credit card, a coupon card, a membership card, or an identification card to allow the consumer 160 to provide verification information as a legitimate user of the discount or sales as provided by the data-carrying item 164. The consumer card 166 may contain the information in barcode, magnetic strip, or in any form that can be read or scanned by a reader.

The kiosk 170 is a station, a terminal, or a unit that allows the customer 160 to interact with the system to redeem coupon, print out coupon, print out product receipt, etc. The kiosk 170 may be a self-contained unit or linked with a network that may connect it to other servers or databases.

The check-out stands 180 is a place where the customer 110 or 160 and other shoppers check out their purchases. The check-out stand 180 may have scanner, reader, or other device to read or scan a coupon, a check-out item, a purchased product, a product receipt, etc. when the customer 110 or 160 checks out his or her transaction or purchases.

Figure 2:
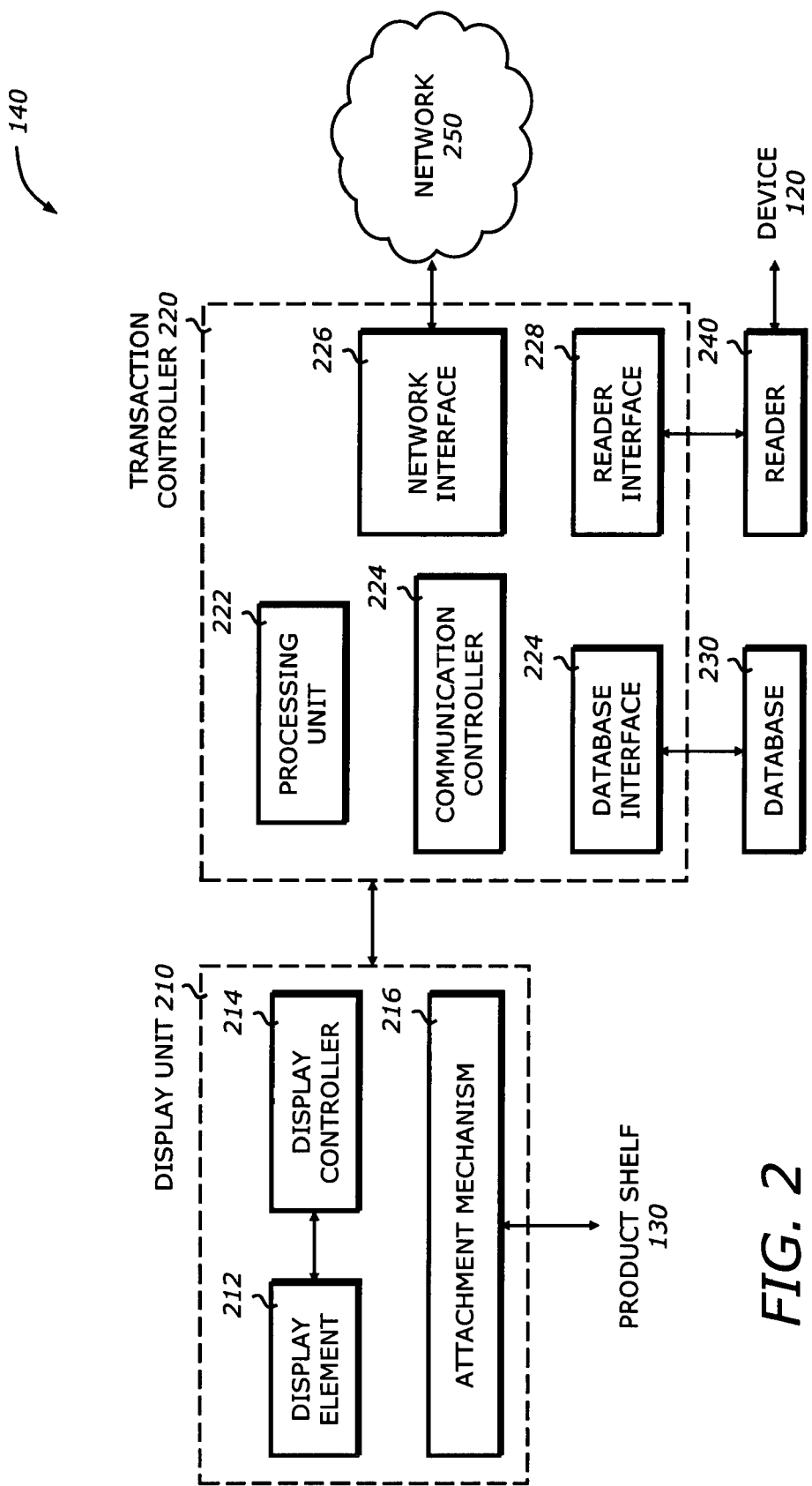
FIG. 2 is a diagram illustrating a product transaction module according to one embodiment of the invention.

FIG. 2 is a diagram illustrating a product transaction module 140 shown in FIG. 1 according to one embodiment of the invention. The product transaction module 140 includes a display unit 210, a transaction controller 220, a database 230, and a reader 240. Note that product transaction module 140 may contain more or less than the above components. Furthermore, the connectivity of these components may be wired or wireless.

The display unit 210 shows product information on a product. The product may be the merchandise item 150 placed on the product shelf 130, or any product sponsored or sold by the retailer. It includes a display element 212, a display controller 214, and an attachment mechanism 216.

The display element 212 is an element that may display the product information in a form that can be easily seen from a distance. It may be made of any display type such as light-emitting diodes (LED), liquid crystal display (LCD), neon light, flat panel, plasma display, etc. The display pattern may be constant or flashing to attract attention such as when announcing a sales or promotional program. It may have variable shape, size, or dimensions that fit the shelf 130 and/or the corresponding product 150.

The product information may be image, graphics, or textual data. The product information includes at least one of product description, price, expiration date, sales details, manufacturer, discount information, rebate information, sweepstake rules, purchase limit, and physical location of the product. The product information may provide information on the corresponding product being displayed on the shelf 130 or on a promotional product. The product information may be an advertisement for a new product, a current or future sales program, a current or future sales period, a discount or rebate information for currently displayed or stocked products or future products, etc.

The display controller 214 controls the display element 212. It may be a processor that can execute a program or instructions upon receiving a command from the transaction controller. It may include a wired or wireless communication interface to communicate with the transaction controller 220. The wireless communication may be optical, radio frequency, sonic, etc. The attachment mechanism 216 is any mechanism that secures the display unit to the shelf 130. It may be a lockable receptacle that locks onto the shelf 130. It may have threaded screws to attach the display unit to the shelf 130. It may also be glued to the shelf 130

The transaction controller 220 is communicatively attached or coupled to the display unit 210 to provide the product information. It includes a processing unit 221, a communication controller 222, a database interface 224, a network interface 226, and a reader interface 228. Note that the transaction controller 220 may contain more or less than the above elements. For example, the reader interface 228 may be optional. Furthermore, all or part of the above elements may be implemented by hardware, software, firmware, or any combination thereof. For example, the communication controller 222 may be a firmware or software module that is executed by the processing unit 221.

The processing unit 221 controls the various components in the transaction controller 220. It may be a programmable unit which executes programs or instructions, or it may be a dedicated hardware circuit. As a programmable unit, it is described in details in FIG. 7.

The communication controller 222 communicates with the display unit 210 regarding the product information using a wired or wireless connectivity. The wireless connectivity may be optical (e.g., infrared), electromagnetic, radio frequency, and sonic (e.g., ultrasound).

The database interface 224 interfaces to the database 230 to retrieve the product information stored in the database 230. The database interface 224 may include a port connection such as wireless port, Bluetooth interface, universal serial bus (USB), smart card interface, storage medium interface, etc.

The network interface 226 interfaces to a network 250 to exchange information with a remote device such as a server, a terminal, or a computer. The network 250 may be any suitable network such as local area network (LAN), wide area network (WAN), Internet, intranet, extranet, WiFi, etc.

The reader interface 228 interfaces to a reader 240. The reader interface 228 allows the transaction controller 220 to read information embedded in the device 120. The reader 240 may be any reader that can read, scan, or retrieve information embedded in the device 120. It may be a barcode reader, a magnetic strip reader, a character recognition unit, an image analyzer, a RFID reader, etc.

The database 230 is communicatively coupled to the transaction controller 220 to store the product information and/or customer information. The database 230 may be part of a computer system or a standalone database in a form of a storage medium such as memory stick, memory module, disk, compact disk (CD), digital versatile disk (DVD), etc. The product information includes any information related to the products being sold, sponsored, or advertised by the retailer. The product information may include the physical location of the products being sold or displayed such as the aisle number, the shelf number, etc. The product customer information may include information on the customers such as identification, usage history, customer profile, membership, contact information (e.g., address, phone), demographic data, etc.

The database 230 may be interfaced to the transaction controller 220 via a network. The store manager or the administrator may access the database remotely such as via a Web browser so that when the announcement is made on-line, the information may go to the specified or designated store or retailer.

A number of sales activities may be organized using the PTM 140. For example, a sweepstake promotion may be carried out in the store. The PTM 140 may flash or display a sweepstake as an advertisement campaign for a product or for the store on special occasions. A customer may be interested in participate in the sweepstake. He or she may swipe or wave his or her device 120. The reader 240 scans or reads the customer information and verifies if the holder is eligible for the sweepstake, such as conforming to the sweepstake rules (e.g., limit one per household). Through network connections, a centralized system may be able to determine if the consumer has participated in the sweepstake before or in other stores. Depending on the sweepstake rules, a lottery or random selection process may take place to determine sweepstake winners. The PTM 140 may flash the names of the winners, make the announcement, and identify the prize(s). The winner may then have a chance to redeem the prize at the check-out stand or at a customer service center. The sweepstake may take place in the store or on-line as the shopper shops on-line. For on-line activities, a consumer may enter or scan his or her consumer card (e.g., a member card) or enter his or her card number.

Figure 3:
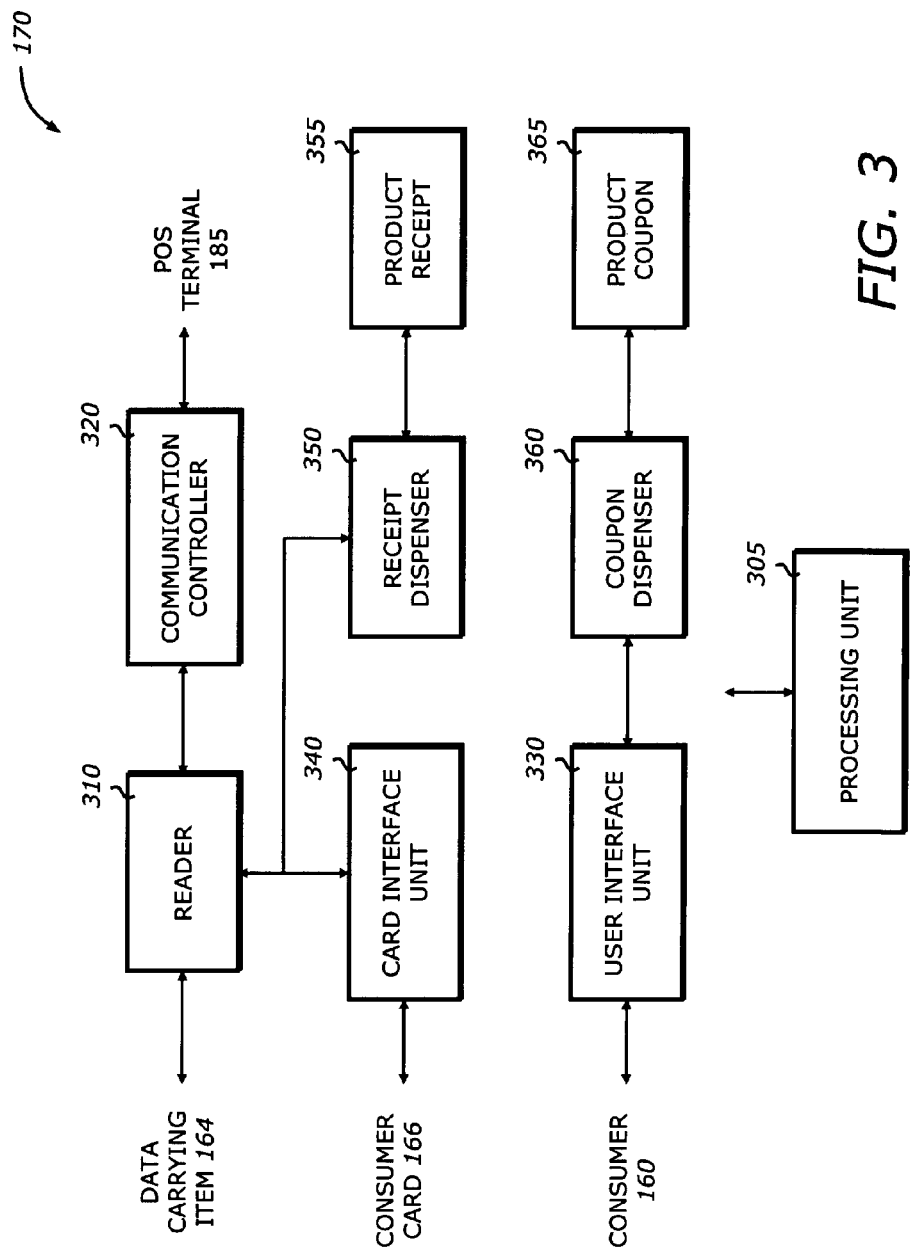
FIG. 3 is a diagram illustrating a kiosk according to one embodiment of the invention.

FIG. 3 is a diagram illustrating the kiosk 170 shown in FIG. 1 according to one embodiment of the invention. The kiosk 170 includes a processing unit 305, a reader 310, a communication controller 320, a user interface unit 330, a card interface unit 340, a receipt dispenser 350, and a coupon dispenser 360. The kiosk 170 may include more or less than the above elements. For example, it may also include either the receipt dispenser 350 or the coupon dispenser 360, or both, or a dispenser that can perform both functions. Furthermore, all or part of the above elements may be implemented by hardware, software, firmware, or any combination thereof. For example, the communication controller 320 or the user interface unit 330 may be a firmware or software module that is executed by the processing unit 305. The kiosk 170 may be used by the consumer 160 or by the retailer or the manufacturer to process coupons electronically. For example, the retailer may scan in the coupons or retrieve the coupon or discount information electronically.

The processing unit 305 controls the various components in the kiosk 170. It may be a programmable unit which executes programs or instructions, or it may be a dedicated hardware circuit. As a programmable unit, it is described in details in FIG. 7.

The reader 310 reads product information related to a product from the data-carrying item 164. The reader 310 may be an optical or magnetic reader to scan the product information embedded in the data-carrying item 164 presented by a consumer. It may be a character recognition reader that can read or scan textual data. It may also be an image or graphic analyzer to recognize image, graphical data, icons, or symbols. As discussed earlier, the product information embedded in the data-carrying item 164 may be the product name, manufacturer, discount value, sales period, expiration date, limit rule (e.g., one per product). The data-carrying item 164 may be a paper coupon (e.g., coupons cut from newspapers, magazines), a product identifier, or a promotional item (e.g., advertisement pamphlets). The product information may then be downloaded or transferred electronically such as via the Internet to a remote computer or terminal used by the consumer 160 so that he or she can use the receipt provided by the kiosk 170 for on-line purchases. The reader 310 may also be used by the retailer personnel to process coupons electronically.

The communication controller 320 is coupled to the reader to transmit the product information retrieved from the data-carrying item 164 to the point-of-sale (POS) terminal 185 at the check-out stand 180 (FIG. 1). The retrieved product information may then be used to verify with the item purchased by the consumer 160 at the check-out stand 180. If the information matches, then a discount or rebate may be given for that purchased item. Alternatively, a gift certificate, a gift card, or a store credit may be given.

The user interface unit 330 allows the consumer 160 to enter personal data identifying the consumer 160. The user interface unit 330 may include a keyboard, a mouse, or any other input entry device to allow the consumer 160 to enter data. It may also include a display to show the items, product information, discount information, or coupon information. The personal data may be a personal identification number (PIN), a membership number, or any other identifier. The personal data may then be used to validate the consumer 160 as a legitimate user of a coupon. The consumer 160 may be a registered user of a coupon or discount service. His or her information may be stored in the database and can be verified. The personal data may also be used to verify the consumer card 166 as swiped or scanned by the consumer 160. The user interface unit 330 may also provide menu or selectable items to allow the consumer 160 to select the products, product information, or the coupons.

The card interface unit 340 is coupled to the reader 310 to transfer the product information to the consumer card 166 after the consumer card 166 is verified as belonging to the consumer 160 according to the personal data as entered by the consumer 160 as discussed above.

The receipt dispenser 350 is coupled to the reader 310 to dispense or print out a product receipt 355 corresponding to the product information. The product receipt 355 is received at the POS terminal 185 for verification with an item purchased by the consumer 160. The product receipt 355 may be encoded by barcode pattern, or any special symbol to facilitate the scanning and verification at the POS terminal 185.

The coupon dispenser 360 is coupled to the user interface unit 330 to dispense a product coupon 365 corresponding to a coupon pre-selected by the consumer 160. The consumer 160 may select a product or a coupon at the kiosk 170 or remotely from a terminal in advance. At the kiosk 170, the consumer 160 may enter his or her personal data through the user interface unit 330 as described above It is sometimes desirable to tracking usage history or profiles of customers who shop at the stores. The customer information may then be stored in a database for marketing or sales purposes. In addition, the record tracking may be used by marketers to target potential clients for advertisements or promotional activities. The PTM 140 and/or the kiosk 170 provide a means to allow customers to participate in various forms of commercial transactions. A retailer, manufacturer, or marketing company may be interested in keeping records of commercial transactions made by consumers. The consumers may belong to a club or a product interest group that may be organized and administered by a clearinghouse, a marketing company, or any entity.

Figure 4:
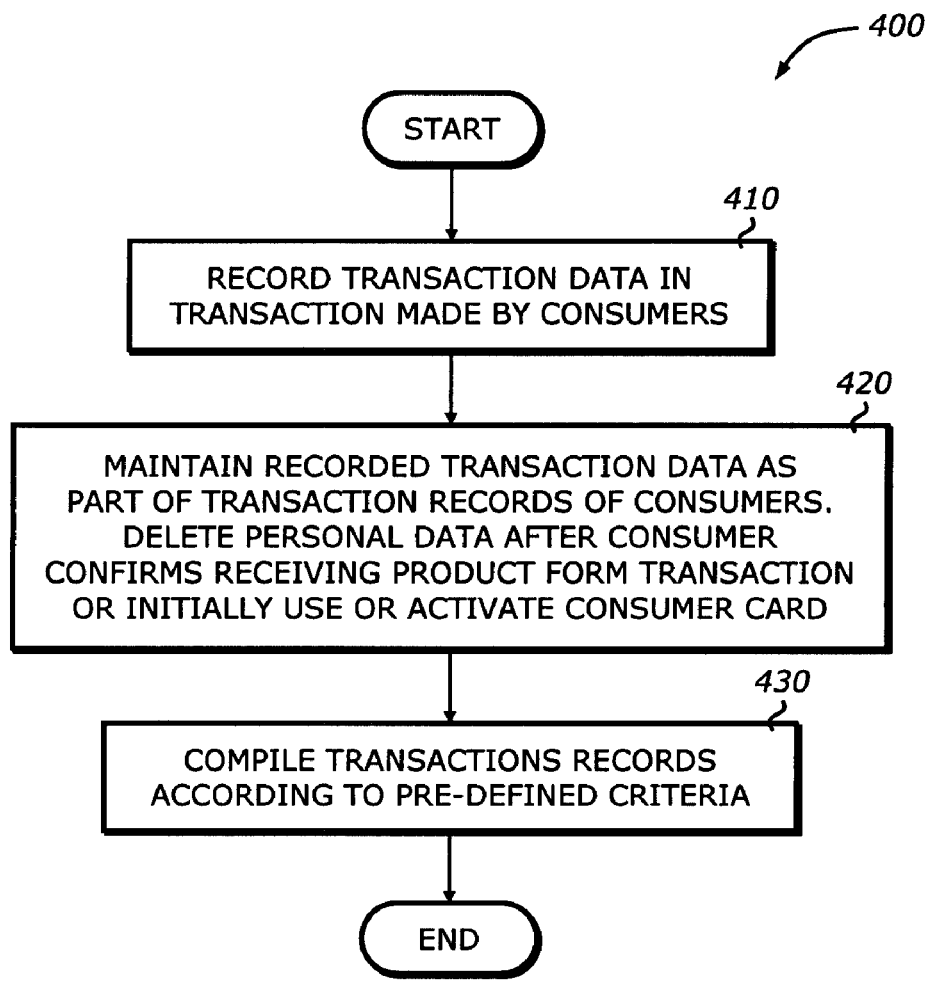
FIG. 4 is a flowchart illustrating a process to simplify consumer record tracking according to one embodiment of the invention.

FIG. 4 is a diagram illustrating a process 400 to simplify consumer record tracking according to one embodiment of the invention. The process 400 may be performed by the processing unit 221 in the PTM 140 or the processing unit 305 in the kiosk 170, or a separate processing system.

Upon START, the process 400 records transaction data in transactions made by a plurality of consumers (Block 410). The transactions may be any commercial transactions such as purchasing, exchanging, returning, downloading, coupon redemption, etc. The purchase may be made on-line or in store. The consumers may be registered or unregistered customers. Registered customers are those who enroll or register with the entity that organizes the record tracking activities. Unregistered customers are those who are not registered but are willing to participate in the record tracking.

The process 400 records the transaction data each time one of the consumers makes a product purchase on-line or in store. The transaction data may include at least one of personal data related to the one of the consumers, product information, purchase information, and demographic data. The personal data may include at least one of name, address, contact information, membership information, and identification information. The product information may include at least one of product name, product manufacturer, product retailer, discount information, and rebate information. The purchase information may include at least price, store name, store location, time of purchase, date of purchase, payment method, shipping method, shipping address, and billing address. The demographic data may include at least one of gender, age group, ethnicity, economy group, and education.

Then, the process 400 maintains the recorded transaction data as part of transaction records of the consumers (Block 420). The transaction records may be stored in a centralized database or a localized database. The centralize database may be accessible by any participating and authorized retailers or business entities. The localized database is local to the store or the sales establishment. The transaction records may be updated regularly or each time a consumer makes a transaction. The maintaining of the recorded transaction data may include deleting the personal data after a consumer confirms receiving a product from the transactions, or when the consumer initially uses or activates a consumer card (e.g., a club card, a loyalty card). The personal data that are deleted may include confidential information such as credit card numbers, account information, etc. For on-line purchases, the consumer may log in to the seller Website to confirm receipt of the shipped products. This may be performed by clicking a menu item on the Web page, or sending a confirmation e-mail, or calling the company's sales operator to inform of the receipt.

Next, the process 400 compiles the transaction records according to pre-defined criteria. The pre-defined criteria may include criteria such as demographic data, store location, usage preferences, etc. The information may be compiled and organized without any actions to identify the individual customers to protect their privacy and confidentiality. The process 400 is then terminated.

Figure 5:
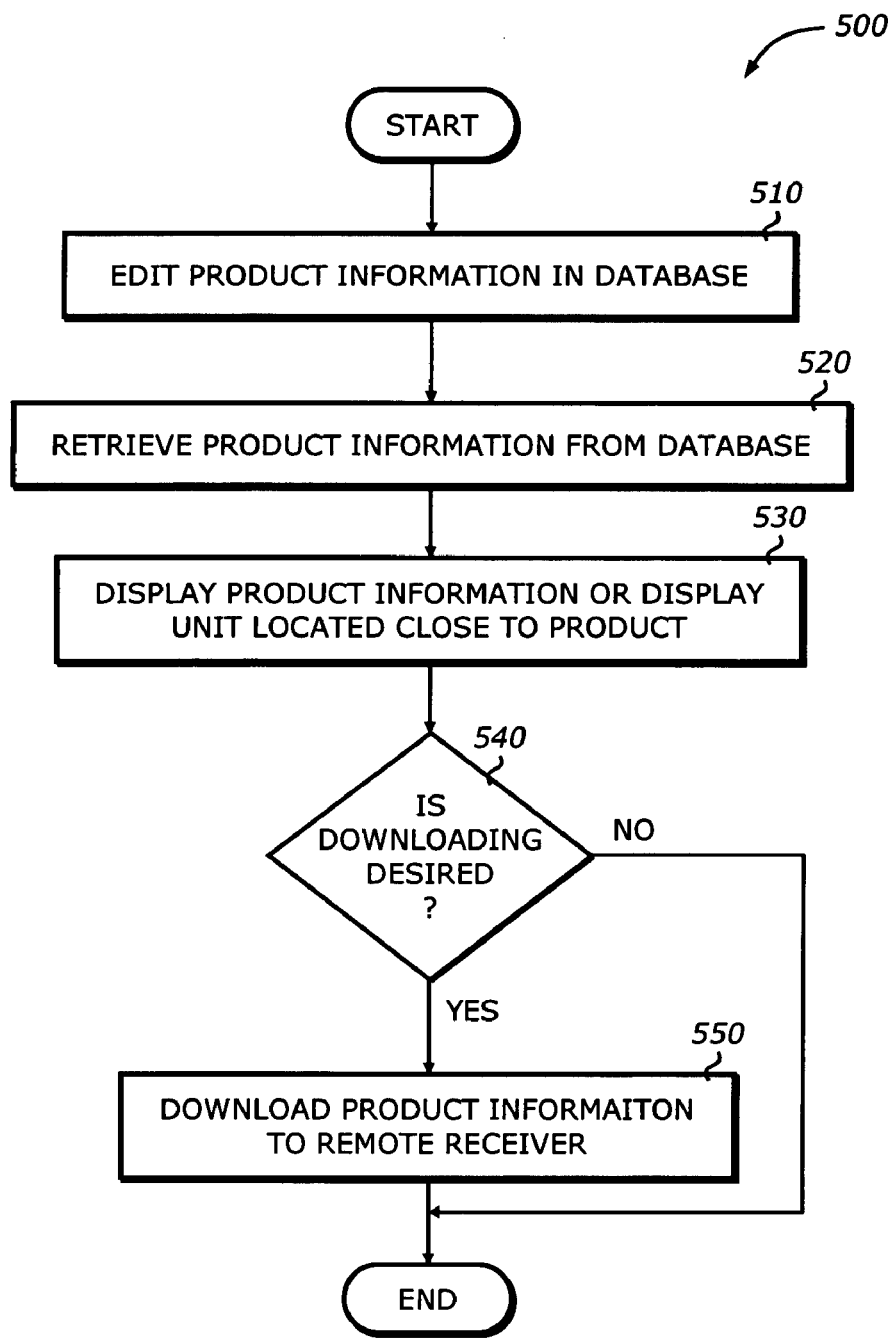
FIG. 5 is a flowchart illustrating a process to display products according to one embodiment of the invention.

FIG. 5 is a flowchart illustrating a process 500 to display products according to one embodiment of the invention. The process 500 may be performed by the PTM 140 shown in FIG. 1.

Upon START, the process 500 edits product information related to a product in a database (Block 510). This may include updating the price of a particular product, extending a promotional period, setting a sales, setting a discount percentage, etc. The product may be a merchandise item displayed on a shelf in the store, or stocked in the local or remote stockroom, or future product. The product information may include at least one of product description, price, expiration date, sales details, manufacturer, discount information, rebate information, sweepstake rules, purchase limit, and physical location of the product. The database may be a local database stored in a storage medium, or a remote database accessible via a network.

Next, the process 500 retrieves the product information from the database (Block 520). The retrieval may be made locally or remotely. Then, the process 500 displays the product information on a display unit attached to a product shelf (Block 530). The product information may correspond to a product or a group of products that may or may not be displayed on the product shelf.

Next, the process 500 determines if downloading is desired (Block 540). If not, the process 500 is terminated. Otherwise, the process 500 downloads the product information to a remote receiver (Block 550). The remote receiver is may be a personal digital assistant, a cellular device, a wireless reader, a bar code reader, a RFID reader, a magnetic reader, a smart card reader, a storage medium reader, a handheld device, a handheld computer, a notebook, or a laptop computer. The process 500 is then terminated.

Figure 6:
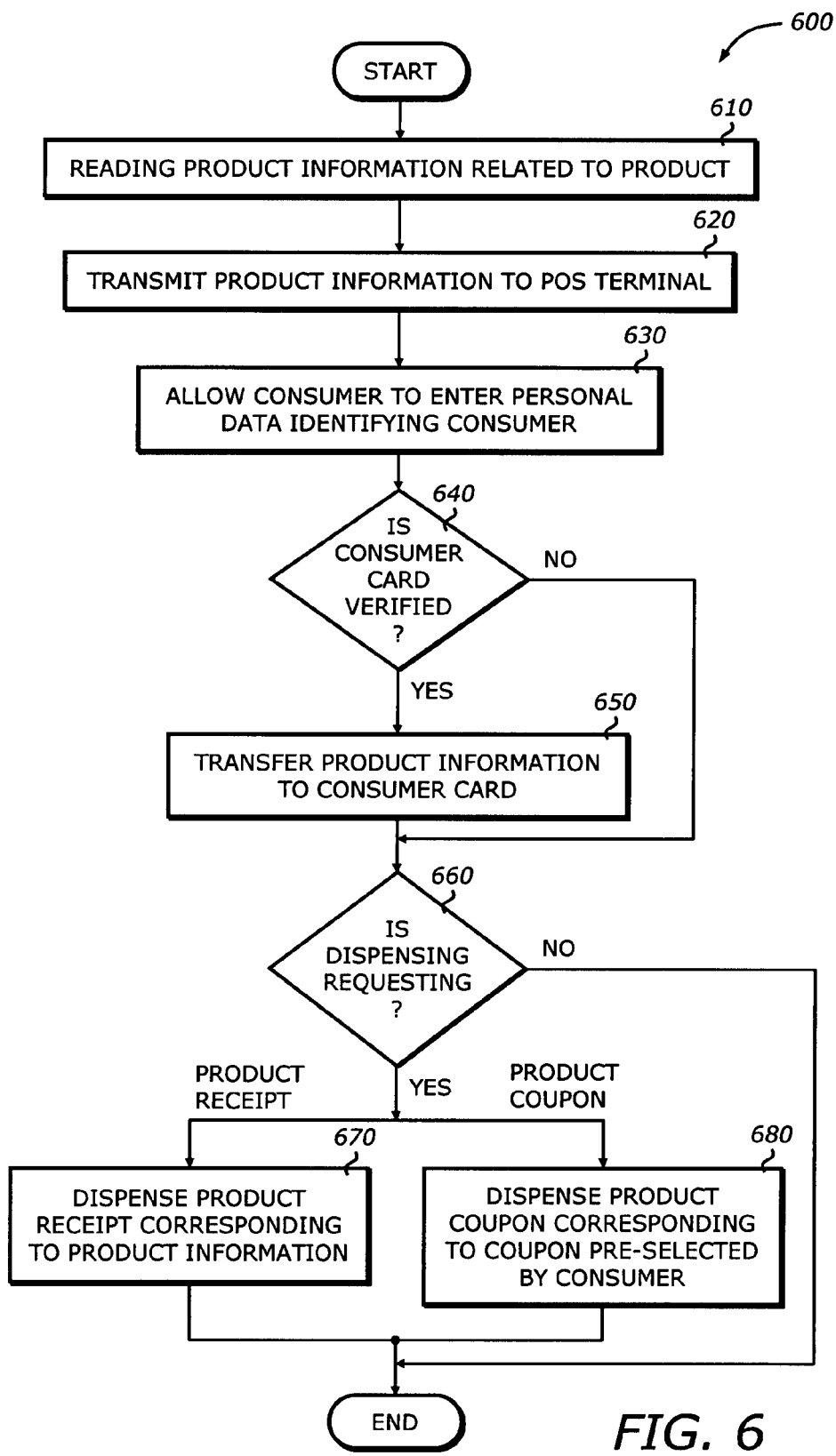
FIG. 6 is a flowchart illustrating a process to service transactions at a kiosk according to one embodiment of the invention.

FIG. 6 is a flowchart illustrating a process 600 to service transactions at the kiosk 170 shown in FIG. 1 according to one embodiment of the invention. The process 600 may be performed by the processing unit 305 of the kiosk 170.

Upon START, the process 600 reads product information related to a product (Block 610). Next, the process 600 transmits the product information to a point-of-sale (POS) terminal (Block 620). The transmission may be wired or wireless. Typically, it is done via a network, either wired or wireless network.

Then, the process 600 allows a consumer to enter personal data identifying the consumer (Block 630). The personal data may include a membership number, a PIN, or any other identifier. Next, the process 600 determines if a consumer card is verified (Block 640). This verification may be performed by matching the consumer card with the consumer's personal data or with the customer information in database. The consumer card may be scanned or swiped by the consumer. If the consumer card is not verified or if the consumer does not desire to use the consumer card or if there is no need for downloading the product information, the process 600 goes to block 660. Otherwise, if the consumer card is verified, the process 600 transfers or downloads the product information to the consumer card.

Next, the process 600 determines if dispensing is desired or requested (Block 660). If not, the process 600 is terminated. Otherwise, if the request is for a product receipt, the process 600 dispenses or prints out a product receipt corresponding to the product information and is then terminated. If the request is for a product coupon, the process 600 dispenses or prints out the product coupon corresponding to the coupon preselected by the consumer. The process 600 is then terminated.

Figure 7:
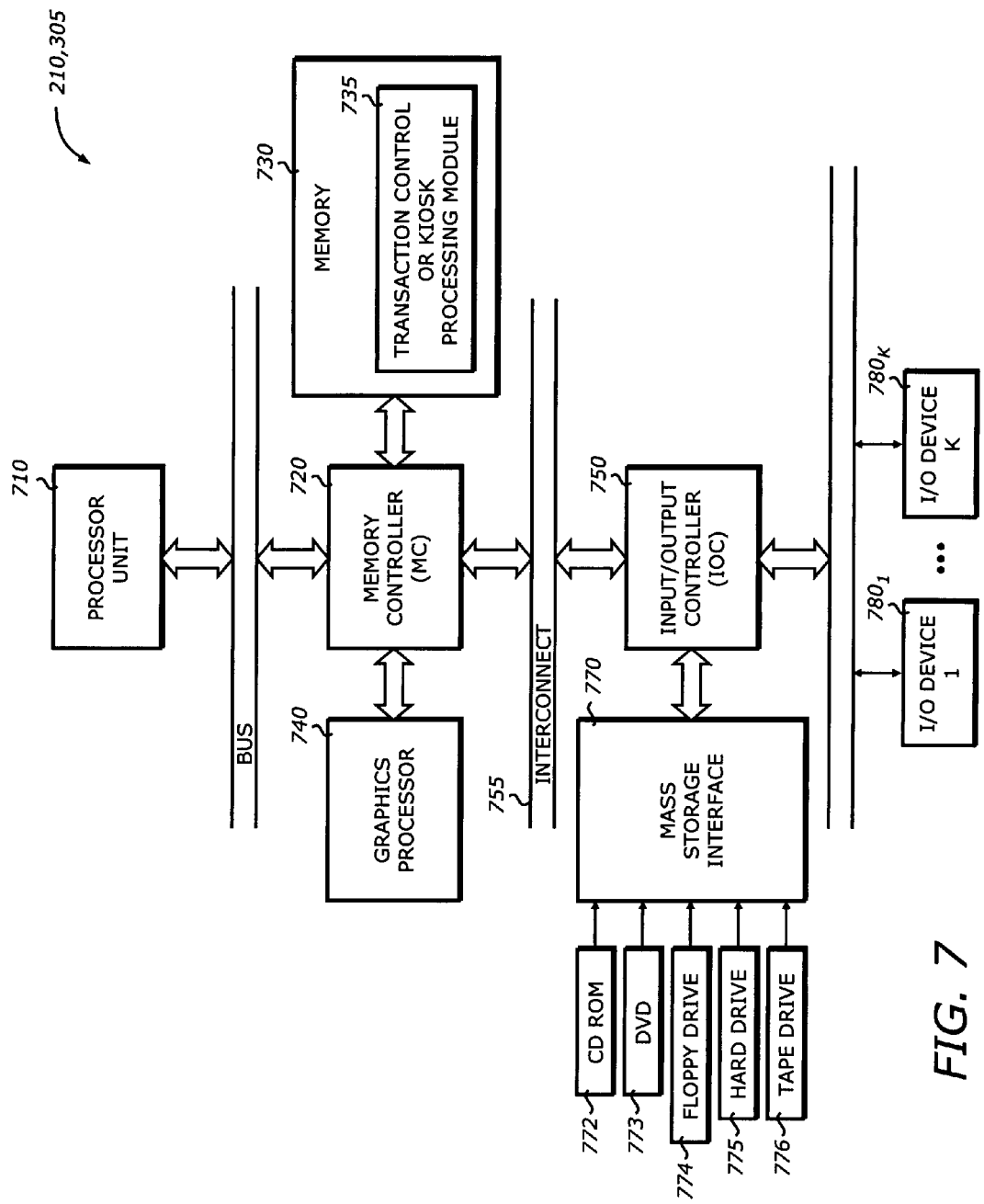
FIG. 7 is a diagram illustrating a processing unit according to one embodiment of the invention.

FIG. 7 is a diagram illustrating the processing unit 220 or the kiosk 170 shown in FIGS. 2 and 3, respectively, according to one embodiment of the invention. The processing unit 220 or the kiosk 170 includes a processor unit 710, a memory controller (MC) 720, a main memory 730, a graphics processor 740, an input/output controller (IOC) 750, an interconnect 755, a mass storage interface 770, and input/output (I/O) devices $780_1$ to $780_K$.

The processor unit 710 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 720 provides control and configuration of memory and input/output devices such as the main memory 730 and the IOC 740. The MC 720 may be integrated into a chipset that integrates multiple functionalities such as graphics, media, isolated execution mode, host-to-peripheral bus interface, memory control, power management, etc. The MC 720 or the memory controller functionality in the MCH 720 may be integrated in the processor unit 710. In some embodiments, the memory controller, either internal or external to the processor unit 710, may work for all cores or processors in the processor unit 710. In other embodiments, it may include different portions that may work separately for different cores or processors in the processor unit 710.

The main memory 730 stores system code and data. The main memory 730 is typically implemented with dynamic random access memory (DRAM), static random access memory (SRAM), or any other types of memories including those that do not need to be refreshed. The main memory 730 may include multiple channels of memory devices such as DRAMs. The main memory 730 may include a transaction control module or kiosk processing module 735. The transaction control module or kiosk processing module 735 includes program instructions and data to perform transaction control or kiosk processing functions. These functions may include the functions performed by at least one of the communication controller 222, database interface 224, network interface 226, reader interface 228 in the transaction controller 220 (FIG. 2); or at least one of the reader 310, communication controller 320, user interface unit 330, card interface unit 340, receipt dispenser 350, or coupon dispenser 360 in the kiosk 170 (FIG. 3).

The graphics processor 740 is any processor that provides graphics functionalities. The graphics processor 740 may also be integrated into the MC 720 to form a Graphics and Memory Controller (GMC). The graphics processor 740 may be a graphics card such as the Graphics Performance Accelerator (AGP) card, interfaced to the MC 720 via a graphics port such as the Accelerated Graphics Port (AGP) or a peripheral component interconnect (PCI) Express interconnect. The graphics processor 740 provides interface to an external display device such as standard progressive scan monitor, television (TV)-out device, and Transition Minimized Differential Signaling (TMDS) controller.

The IOC 750 has a number of functionalities that are designed to support I/O functions. The IOC 750 may also be integrated into a chipset together or separate from the MC 720 to perform I/O functions. The IOC 750 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 755 provides interface to peripheral devices. The interconnect 855 may be point-to-point or connected to multiple devices. For clarity, not all interconnects are shown. It is contemplated that the interconnect 755 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 770 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 772, digital versatile disc (DVD) 773, floppy drive 774, hard drive 775, tape drive 776, and any other magnetic or optic storage devices. The mass storage device provides a mechanism to read machine-accessible media.

The I/O devices $780_1$ to $780_K$ may include any I/O devices to perform I/O functions. Examples of I/O devices $780_1$ to $780_K$ include controller for input devices (e.g., keyboard, mouse, trackball, pointing device, and remote control unit), media card (e.g., audio, video, and graphic), network card, and any other peripheral controllers.

Elements of one embodiment of the invention may be implemented by hardware, firmware, software or any combination thereof. The term hardware generally refers to an element having a physical structure such as electronic, electro-magnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include information or data that, when accessed by a machine, cause the machine to perform the operations or actions described above. The machine accessible medium may also include program code embedded therein. The program code may include machine readable code to perform the operations described above. The term "information" or "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a reader to read product information related to a product;
   a communication controller coupled to the reader to transmit the product information to a point-of-sale (POS) terminal;
   a user interface unit to allow a consumer to enter personal data identifying the consumer; and
   a card interface unit coupled to the reader to transfer the product information to a consumer card after the consumer card is verified as belonging to the consumer according to the personal data.

2. The apparatus of claim 1 wherein the reader comprises:
   an optical or magnetic reader to scan the product information embedded in a data-carrying item presented by a consumer.

3. The apparatus of claim 2 wherein the data-carrying item is one of a coupon, a product identifier, and a promotional item.

4. The apparatus of claim 2 further comprising:
   a dispenser coupled to the user interface unit to dispense a product coupon corresponding to a coupon pre-selected by the consumer.

5. The apparatus of claim 1 further comprising:
   a dispenser coupled to the reader to dispense a product receipt corresponding to the product information, the product receipt being received at the POS terminal for verification with an item purchased by the consumer.

6. The apparatus of claim 1 wherein the product information includes at least one of product description, price, expiration date, sales details, manufacturer, discount information, rebate information, sweepstake rules, purchase limit, and physical location of the product.

7. The apparatus of claim 1 wherein the personal data include at least one of name, address, contact information, membership information, and identification information.

8. A method comprising:
   reading product information related to a product;
   transmitting the product information to a point-of-sale (POS) terminal;
   allowing a consumer to enter personal data identifying the consumer; and
   transferring the product information to a consumer card belonging to the consumer after the consumer card is verified.

9. The method of claim 8 further comprising:
   dispensing a product receipt corresponding to the product information or a product coupon corresponding to a coupon pre-selected by the consumer.

10. The method of claim 8 wherein the product information includes at least one of product description, price, expiration date, sales details, manufacturer, discount information, rebate information, sweepstake rules, purchase limit, and physical location of the product.

11. The method of claim 8 wherein the personal data include at least one of name, address, contact information, membership information, and identification information.

12. An article of manufacture comprising:
    a machine-accessible storage medium including information that, when accessed by a machine, cause the machine to perform operations comprising:
    reading product information related to a product;
    transmitting the product information to a point-of-sale (POS) terminal;
    allowing a consumer to enter personal data identifying the consumer; and
    transferring the product information to a consumer card belonging to the consumer after the consumer card is verified.

13. The article of manufacture of claim 12 wherein the information further comprises information that, when accessed by a machine, cause the machine to perform operations comprising:
    dispensing a product receipt corresponding to the product information or a product coupon corresponding to a coupon pre-selected by the consumer.

14. The article of manufacture of claim 12 wherein the product information includes at least one of product description, price, expiration date, sales details, manufacturer, discount information, rebate information, sweepstake rules, purchase limit, and physical location of the product.

15. The article of manufacture of claim 12 wherein the personal data include at least one of name, address, contact information, membership information, and identification information.

* * * * *